United States Patent
Terruzzi

(12) 
(10) Patent No.: US 6,972,048 B2
(45) Date of Patent: Dec. 6, 2005

(54) CEMENT PAINT

(75) Inventor: Claudio Terruzzi, Salzburg (AT)

(73) Assignee: Global Engineering and Trade S.R.L., Milan (IT)

( * ) Notice: Subject to any disclaimer, the term of this patent is extended or adjusted under 35 U.S.C. 154(b) by 0 days.

(21) Appl. No.: 10/827,350

(22) Filed: Apr. 20, 2004

(65) Prior Publication Data

US 2005/0081756 A1    Apr. 21, 2005

(30) Foreign Application Priority Data

Oct. 16, 2003   (EP) .................................. 03425669

(51) Int. Cl.[7] ..................... C04C 14/02; C04C 14/22; C04C 14/28
(52) U.S. Cl. ..................... 106/738; 106/817
(58) Field of Search ................ 106/738, 817

(56) References Cited

U.S. PATENT DOCUMENTS

| | | | |
|---|---|---|---|
| 4,495,228 A | | 1/1985 | Cornwell |
| 4,762,563 A | * | 8/1988 | Colin .......................... 106/712 |
| 5,650,004 A | * | 7/1997 | Yon ............................ 106/719 |

FOREIGN PATENT DOCUMENTS

| | | |
|---|---|---|
| EP | 1 162 182 A1 | 12/2001 |
| FR | 2 342 948 | 9/1977 |
| GB | 1 604 405 | 12/1981 |
| WO | WO 03/022462 A1 | 3/2003 |

* cited by examiner

*Primary Examiner*—Elizabeth D. Wood
(74) *Attorney, Agent, or Firm*—Browdy and Neimark, PLLC

(57) ABSTRACT

It is disclosed a cement paint comprising a pigmenting substance (2), a cement binder (6) and a fluidizing liquid (4) and further comprising: a calcareous aggregate (7) including calcareous granules of calcium carbonate $CaCO_3$ having maximum sizes smaller than 100 microns, a vitreous aggregate (8) including vitreous granules having maximum sizes smaller than 100 microns, and a photocatalyst (9) adapted to oxidize polluting substances in the presence of light and air.

13 Claims, 1 Drawing Sheet

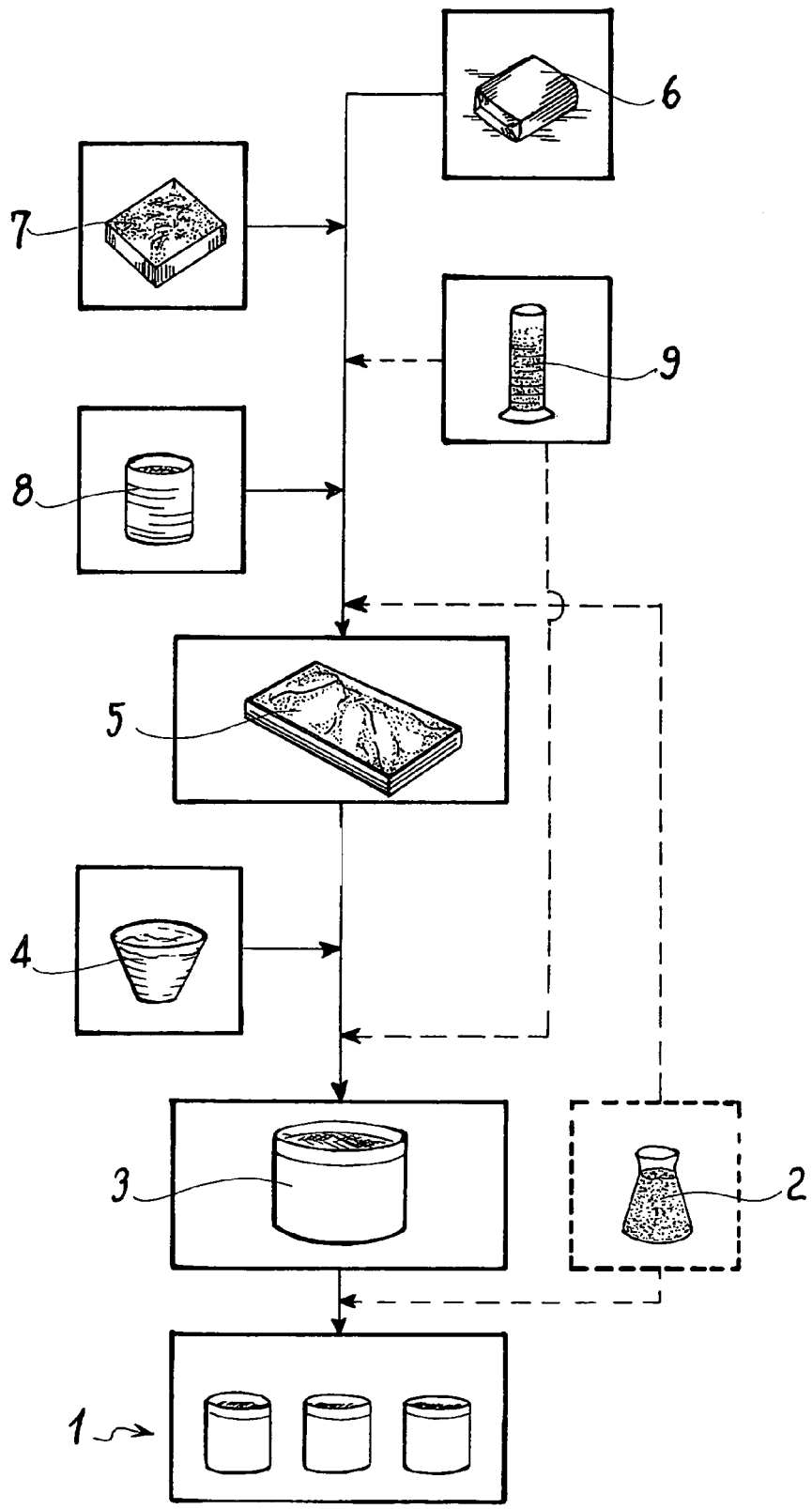

US 6,972,048 B2

CEMENT PAINT

FIELD OF THE INVENTION

The present invention relates to a cement paint to be used for coating various different surfaces with thin films, of the type comprising a pigmenting substance, a cement binder and a fluidizing liquid.

DESCRIPTION OF THE PRIOR ART

It is known that paint is currently defined as a mixture of a pigment and a suitable "vehicle". The "vehicle" usually aims at hardening the pigment and giving it some consistency, forming with the same a film adhering to the treated surface.

In particular, the pigment or coloring matter is a chemically stable product with a good covering power so that it can be used to give some dyeing to any item.

The "vehicle" is on the contrary a fluid product that when spread in a thin layer over any item dries leaving a solid and hard film thereon, which film adheres to the item itself and can withstand the action of the atmospheric agents.

Cement paints are so-called because the "vehicle" in which the pigment is inserted and mixed comprises cement material, a common cement for example. Also considered as cement paints are those having a dye which is a direct consequence of the color of the "vehicle" consisting of cement material, in which addition of a pigment is actually superfluous either because the suitable color is already that of the "vehicle" or because the naturally existing color is not of importance since application of other paint layers is foreseen.

Cement paints are distinguishable due to their qualities in terms of resistance to the atmospheric agents and duration in time. Therefore they are also suitable for application on surfaces exposed to the inclemency of the weather.

They also have a high consistency and covering capacity and, while being in the form of films, help in making the treated surfaces smooth, homogeneous and well finished.

The consistency of cement paints, in spite of the reduce thickness of the formed films, makes the same also adapted to reduce emerging of humidity from the walls.

Beside the above qualities there are some drawbacks typical of paints and also connected with the presence of cement material.

First there is the possibility that cracks or breaks in the paint may spontaneously take place over time, due to a phenomenon of paint shrinkage or to the fact that said paint becomes brittle.

Secondly, flow ability or workability of cement paints is not optimal due to the pasty quality of the cement material present therein.

This may give rise to a marked application slowness or difficulty, above all when spreading takes place by means of a brush.

In addition, the non optimal flow ability or workability makes it difficult to set very thin films, which will result in a greater paint consumption by users and consequent higher application costs.

Then the presence of a "vehicle" of the cement type, naturally opaque, does not facilitate achievement of a satisfactory paint brightness, when this is required.

Finally, cement paints—like paints in general—retain dust and pollutants present in the atmosphere and also allow possible flourishing of bacteria and fungi thereon.

Therefore they must be submitted to periodical cleaning and/or sanitizing operations, above all when said paints are applied in very frequented or polluted environments, or in hospital environments.

SUMMARY OF THE INVENTION

Under this situation the technical task underlying the present invention is to devise a cement paint capable of substantially obviating the mentioned drawbacks.

This technical task is achieved by a cement paint, comprising a pigmenting substance, a cement binder and a fluidizing liquid, and further comprising at least: a calcareous aggregate comprising calcareous granules of calcium carbonate $CaCO_3$ having maximum sizes smaller than 100 microns, a vitreous aggregate comprising vitreous granules having maximum sizes smaller than 100 microns; and a photo catalyst adapted to oxidize polluting substances in the presence of light and air.

BRIEF DESCRIPTION OF THE DRAWING

The features and advantages of the invention are set out hereinafter in the detailed description of preferred embodiments of the invention, with reference to the accompanying drawing sheet, in which:

the only FIGURE shows the main steps of making a cement paint with the help of a block diagram of the main components.

DESCRIPTION OF THE PREFERRED EMBODIMENTS

The cement paint or inventive paint is denoted at 1. In the FIGURE said paint is shown in the last block of the block diagram already packaged in tins and ready for use.

The cement paint 1 comprises at least one pigmenting substance or pigment 2 mixed with a "vehicle" 3.

The coloring matter or pigment 2 is a chemically stable solid product provided with a covering power and can be in any case selected from those known and currently usable.

"Vehicle" 3 is on the contrary a fluid substance that spontaneously hardens in the air and gives consistency to pigment 2, forming with the latter a film adhering to the treated surface.

"Vehicle" 3 is in turn formed of an appropriate fluidizing liquid 4 that in paint 1 advantageously is mere water, and of a powdered dry preparation 5.

In accordance with the invention, the dry preparation 5 is made up of many components originally selected and combined.

It is distinguishable a cement binder 6 known in itself and from which the paint name originates, which is preferably a white-colored cement-based product. Then a combination of two aggregates is provided: a calcareous aggregate 7 and a vitreous aggregate 8.

The calcareous aggregate 7 is substantially defined by calcareous granules of calcium carbonate $CaCO_3$ obtained in the industry or from natural products. In the industry calcium carbonate is obtained through saturation of lime milk with $CO_2$ for example, so as to obtain the so-called "precipitated carbonate" whereas from natural products it is obtained by a very fine grinding of a calcareous stone, for example.

The calcareous aggregate 7 to be used is provided to be in the form of calcareous granules of very small particle sizes, i.e. with sizes smaller than 100 microns, and preferably with sizes smaller than 50 microns.

However the amount of calcareous aggregate 7 can vary within wide limits depending on the mechanical features desired in the paint. For example, the calcareous aggregate can be in an amount by weight included between the same amount as that of the cement binder 6 or twice that amount.

The vitreous aggregate 8 is substantially defined by vitreous granules.

Each granule comprises a single glass fragment or several glass fragments bound together. Each glass fragment is preferably obtained by grinding and advantageously is of the E-AR type.

The abbreviation "E" identifies a glass having optimal qualities of resistance and high modulus of elasticity, high melting point. It can be defined as a calcium and aluminum borosilicate with a low alkali content.

The abbreviation "AR" (alkali-resistant) identifies a glass with the additional feature of having a high content of zirconium oxide $ZrO_2$ and a high resistance to acid and alkaline attacks, in particular cement attacks.

In vitreous granules made of a plurality of E-AR glass fragments agglomerated with each other, the binding agent forming the agglomeration is preferably an aminosilane.

In particular it is an aminosilane having the formula: $NH_2(CH_2)_3Si(OC_2H_5)_3$. The vitreous granules of the above described type are identified with "perlex" from Saint Gobain Vetrotex International S.A.

These granules are selected with sizes smaller than 100 microns and preferably with sizes smaller than 50 microns, of 45 microns for example.

They have a white color with a high roughness or surface unevenness and an apparent density equal to or less than 1.5 grams per cubic centimeter.

Said vitreous granules are inserted in the cement paint in amounts lower than 25% by weight of the cement binding agent, equal to 3% of said weight itself, for example.

The vitreous aggregate 8 improves the properties of the cement paint 1 to a great degree.

A characteristic of said vitreous granules in fact consists in improving flow ability of the paint when said paint is still in a fluid state, because in this case the granules behave like very movable "microballs" promoting spreading of the paint and arrangement of same in thin layers.

Another feature is that of improving the mechanical features of the cement paint 1 when the latter is hardened and in the form of film. In fact the vitreous granules greatly increase hardness of the cement paint film and therefore the resistance to impact and abrasion of same.

Another quality of said granules resides in that they also increase the paint brightness, due to their vitreous nature.

Above all, the vitreous aggregate 8 increases the dimensional stability of the paint, reducing the paint tendency to shrinkage and cracking.

The last-mentioned property is due to the fact that the granules that are substantially non-deformable, have a rough surface that stably clings to the surrounding material, hindering cracking of same.

The action of the vitreous granules is enhanced by the fact that the maximum sizes of the vitreous granules and calcareous granules are similar and by the fact that it is advantageously provided for said granules to have real sizes similar or substantially equal to each other.

In this way a uniform and optimal dispersion of the vitreous granules in the mass of the calcareous aggregate may easily take place and in addition said calcareous aggregate cannot by its sizes surpass the action of said microballs of the aggregate or make it fruitless.

Another component of the cement paint 1 preferably already inserted in the dry preparation 5 is defined by a photo catalyst 9 adapted to oxidize polluting substances in the atmosphere in the presence of light, air or oxygen.

The photo catalyst 9 can be any substance capable of oxidizing pollutants present in the atmosphere and preferably it consists of an additive including titanium oxide $TiO_2$ or a precursor of the titanium oxide, the so-called titanium paste $TiO_2H_2O$ for example, in any case always including titanium oxide.

The photo catalyst features are known by themselves and are disclosed in the European patent application EP 0946450 for example.

The photo catalyst 9 too is provided in amounts lower than 25% by weight of the cement binding agent 6, of 3% for example.

Introduction of a photo catalyst 9 in the paint gives rise to many important advantages.

In particular the photo catalyst 9 has a partly synergic action to the vitreous aggregate because it tends to set off and increase brightness of the paint.

In fact it exerts a self-cleaning action in the paint helping in keeping the same clean and bright.

Experimental tests conducted by the same Applicant have proved that with the use of photo catalysts of said preferred type surfaces soiled with cigarette tobacco ash extract and carbon black have been substantially brought back to their original color.

In addition photo catalysts have an anti-pollution action by virtue of which, in the presence of light and air, polluting substances such as benzene, carbon black, polycondensate aromatic compounds, nitrogen oxides, etc. are oxidized and converted to sodium nitrates and calcium nitrates for example that precipitate. These positive and advantageous actions are combined with further important positive effects for paints: it has been experimentally found that photo catalysts 9 of said preferred type have an antimicrobial activity and that their oxidizing action inhibits development of fungi and bacteria.

A consequence of this situation is also a deodorizing action of the surfaces to which paint is applied.

The dry preparation 5 generally described above is joined to the already mentioned fluidizing liquid 4, consisting of mere water, so as to form said "vehicle" 3.

Varying amounts of water are set, depending on the paint density that is wished to be obtained. It is in principle provided that the amount by volume of water may vary between about one third of, and about half the amount by volume of the dry preparation 5.

Addition of the pigmenting substance 2 can be carried out at various moments.

For example, it can be added to "vehicle" 3, as in usual paints, or it can be introduced more upstream, so as to form a further component of the dry preparation.

As said, the pigmenting substance 2 can by of any kind.

If the color of "vehicle" 3 is already the desired one, also in the absence of the pigmenting substance 2, said substance can be omitted, which will bring about a reduction in the paint costs. This may for example happen when the desired color is white, since the above described "vehicle" 3 is of a white color, due to use of white cement and aggregates 7 and 8 of a white or clear color.

The pigmenting substance 2 can be omitted also when the cement paint 1 is provided to be used as a background layer or a preparation layer for application of other paints, or as an additional layer to be applied before other paints so as to obtain the qualities mentioned above.

Generally it is also possible to point out that the dry preparation 5 is a powdered material with an apparent specific weight of about 1.50 kilograms per cubic decimeter on an average.

The dry preparation can be marketed in an independent manner, since it can also include the pigmenting substance, or it can be dispensed with the need for said pigmenting substance since in these cases it can be applied by mere addition of water.

"Vehicle" 3 resulting from mixing of the dry preparation 5 with water has a varying consistency between a fluid and a plastic one depending on the amount of water, pH of about 13.

"Vehicle" 3 too can be marketed in an independent manner, to enable addition of a coloring substance at will, or when said substance is not provided for the reasons set out above. In this case the "vehicle" embodies the final product.

The cement paint in its entirety has an application temperature preferably included between 5 and 35 degrees centigrade and its maximum application thickness, in connection with a single layer, is about 2 millimeters. The minimum thickness can be less than 0.5 millimeters.

It is also pointed out that additives of various types in accordance with a normal knowledge in the field can be added to the above specified individual components, to the dry preparation 5 or to "vehicle" 3.

The invention achieves important advantages.

In fact a cement paint is made in which cracks and shrinkage typical of cement are substantially avoided, due in particular to the presence of said vitreous aggregate 8 and also due to the fact that the calcareous aggregate 7 and vitreous aggregate 8 have similar sizes, which will enable a homogeneous dispersion of the vitreous aggregate.

The vitreous aggregate also helps in making spreading of very thin layers quick and easy, or promotes quick spreading of the cement paint on wide surfaces.

For spreading of said cement paint, brushes, rollers, spatulas or spray guns can be indifferently used.

When paint reaches its final condition of dry film, the vitreous aggregate also gives the film hardness and brightness.

Brightness in the applied color is also a consequence of the action of photo catalyst 9 giving the paint self-cleaning capacity and helping in greatly reducing the environmental pollution.

The paint is also very suitable for application in environments such as hospitals and nursing centers, due to the antibacterial and fungicide action of the catalyst.

The invention is susceptible of many modifications and variations.

For instance, the amounts of the different components can be widely varied and various additives can be added, depending on specific requirements.

In forming the paint, the mixtures can be done in many ways depending on the existing opportunities: for example the photo catalyst can be either immediately associated with the cement binding agent or inserted in the paint as the last element.

What is claimed is:

1. A cement paint comprising a pigmenting substance, a cement binder and a fluidizing liquid, and further comprising at least:
   a calcareous aggregate comprising calcareous granules of calcium carbonate having maximum sizes smaller than 100 microns,
   a vitreous aggregate comprising vitreous granules having maximum sizes small than 100 microns, and
   a photo catalyst to oxidize polluting substances in the presence of light and air;
   wherein said calcareous granules and vitreous granules have sizes similar to each other.

2. The cement paint as claimed in claim 1, wherein said calcareous granules have maximum sizes smaller than 50 microns and wherein said vitreous granules have maximum sizes smaller than 50 microns.

3. The cement paint as claimed in claim 1, wherein said vitreous granules comprise E-AR glass fragments.

4. The cement paint as claimed in claim 1, wherein said vitreous granules comprise glass fragments at least partly agglomerated together by an aminosilane.

5. The cement paint as claim in claim 1, wherein said photo catalyst comprises $TiO_2$.

6. The cement paint as claimed in claim 1, wherein said cement binder comprises white cement.

7. A dry preparation for cement paint, comprising a cement binder and further comprising:
   a calcareous aggregate comprising calcareous granules of calcium carbonate having maximum sizes smaller than 100 microns, and
   a vitreous aggregate comprising vitreous granules having maximum sizes smaller than 100 microns;
   wherein said calcareous granules and vitreous granules have sizes similar to each other;
   wherein said vitreous granules comprise E-AR glass fragments; and
   said dry preparation further comprising a photo catalyst capable of oxidizing polluting substances in the presence of light and air.

8. The dry preparation as claimed in claim 7, wherein said calcareous granules have maximum sizes smaller than 50 microns and wherein said vitreous granules have maximum sizes smaller than 50 microns.

9. The dry preparation as claimed in claim 7, wherein said vitreous granules comprise glass fragments at least partly agglomerated with each other by an aminosilane.

10. The dry preparation as claimed in claim 7, wherein said cement binder comprises white cement.

11. The dry preparation as claimed in claim 7, wherein said photo catalyst comprises $TiO_2$.

12. The cement paint of claim 1, wherein said calcareous aggregate is present in an amount by weight equal to the amount by weight of said cement binder up to twice the weight of said cement binder.

13. The dry preparation of claim 7, wherein said calcareous aggregate is present in an amount by weight equal to the amount by weight of said cement binder up to twice the weight of said cement binder.

* * * * *